United States Patent
Pruitt et al.

(10) Patent No.: US 7,596,588 B2
(45) Date of Patent: Sep. 29, 2009

(54) MANAGING FILES TO BE OFFLOADED BY MULTIPLE USERS INTO A COMMON STORAGE REPOSITORY

(75) Inventors: Dominic T. Pruitt, Tucson, AZ (US); Matthew G. Borlick, Tucson, AZ (US); Dohn R. Buchanan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/327,086

(22) Filed: Jan. 6, 2006

(65) Prior Publication Data
US 2007/0174365 A1 Jul. 26, 2007

(51) Int. Cl.
*G06F 17/30* (2006.01)
*G06F 7/00* (2006.01)

(52) U.S. Cl. ............. 707/205; 707/101; 707/6; 707/204

(58) Field of Classification Search ............ 707/204, 707/205, 101, 6
See application file for complete search history.

(56) References Cited

U.S. PATENT DOCUMENTS

| | | | | |
|---|---|---|---|---|
| 6,490,598 | B1 * | 12/2002 | Taylor | 707/204 |
| 6,938,057 | B2 * | 8/2005 | Gusler et al. | 707/204 |
| 7,024,581 | B1 * | 4/2006 | Wang et al. | 714/2 |
| 7,103,619 | B1 * | 9/2006 | Rajpurkar et al. | 707/204 |
| 7,284,104 | B1 * | 10/2007 | Wu et al. | 711/162 |
| 7,315,826 | B1 * | 1/2008 | Guheen et al. | 705/7 |
| 2003/0004978 | A1 * | 1/2003 | Greenbaum | 707/202 |

* cited by examiner

*Primary Examiner*—Kuen S Lu
(74) *Attorney, Agent, or Firm*—Dan Shifrin

(57) ABSTRACT

A method, system and program product manage files to be offloaded by multiple users into a common storage repository. A request is received from a user to offload a file from a computer. A determination is made whether the file is currently stored in the common storage repository. If the file is not currently stored in the common storage repository, the file is offloaded to the common storage repository. If the file is currently stored in the common storage repository, a link is established for the user to the file in the common storage repository. If the requested file is in-transit, the link is established when the transfer is complete.

15 Claims, 2 Drawing Sheets

MANAGING FILES TO BE OFFLOADED BY MULTIPLE USERS INTO A COMMON STORAGE REPOSITORY

TECHNICAL FIELD

The present invention relates generally to a multi-user computer environment and, in particular, to managing files in a common storage repository in the multi-user computer environment.

BACKGROUND ART

There are numerous instances in which multiple users may require access to the same data file or a group of data files. For example, during the development of a new or updated computer system or subsystem, it is important for testers to be able to access various files on the systems under development. Such files include log files, debug files and other files containing system status information compiled during test runs. Typically, a user wanting to access such a file will issue a file request to a common offload tool. The tool will then locate the file or group of files on the system under test and direct that the file(s) be offloaded into a common storage repository for use by the user. If another user wants to access the same file(s), that user will go through the same procedure, resulting in another copy of the file(s) in the common storage repository. On occasion, the second request may be issued nearly simultaneously with the first.

In many test and other environments, the files may be extremely large and offloading such files to the common storage repository takes a very long time, sometimes several hours. Therefore, not only is unnecessary storage space used when duplicate files are stored in the common storage repository, but unnecessary bandwidth is used for the file transfer and additional burden is placed on the management of the common storage repository.

Furthermore, because the files on the test computers have standard names and employ file wrapping techniques to minimize the space they require on the test computers, it may be difficult for a user to know which specific file is required for a particular problem determination or analysis. Thus, users may often offload an entire set of files when only a smaller subset is required. It will be appreciated that such activity further degrades system performance and storage space usage.

Consequently, a need remains for more efficient management of file offloads to the common storage repository.

SUMMARY OF THE INVENTION

A method, system and program product are provided for managing files to be offloaded by multiple users into a common storage repository. A request is received from a user to offload a file from a computer. A determination is made whether the file is currently stored in the common storage repository. If the file is not currently stored in the common storage repository, the file is offloaded to the common storage repository. If the file is currently stored in the common storage repository, a link is established for the user to the file in the common storage repository. If the requested file is in-transit, the link is established when the transfer is complete.

DETAILED DESCRIPTION OF THE PREFERRED EMBODIMENT

Figure 1:
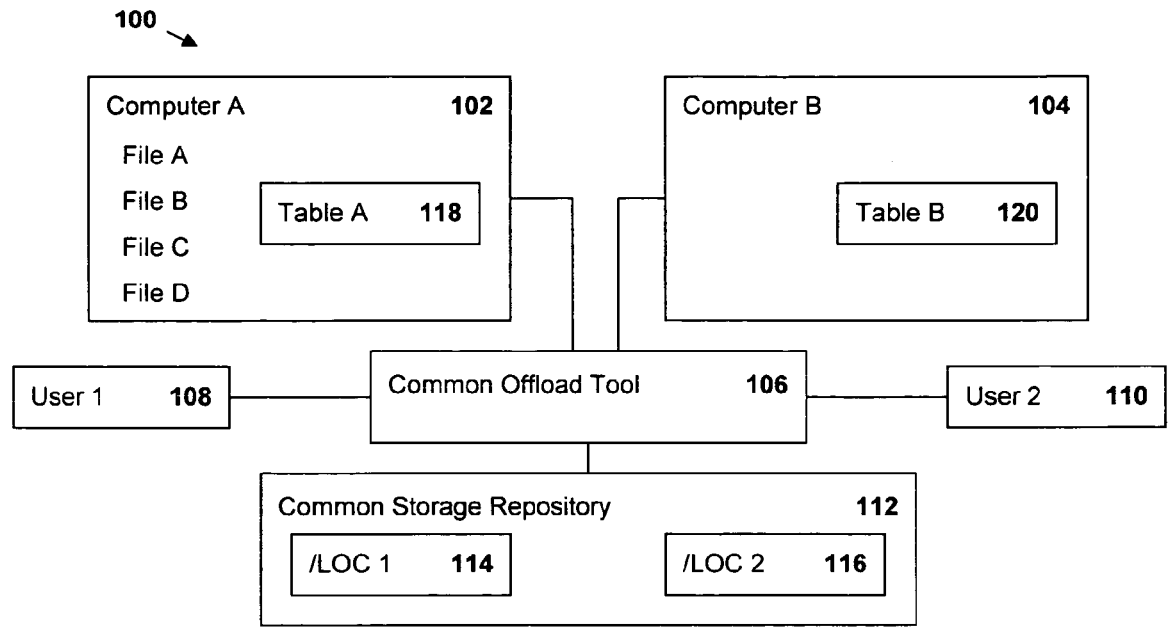
FIG. 1 is a block diagram of a multi-user environment in which the present invention may be implemented.

FIG. 1 is a block diagram of a multi-user environment 100 in which the present invention may be implemented. Test computers 102, 104, or other systems or subsystems to which multiple users require access, are interconnected, such as through a network, with a common offload tool 106. User computers or terminals 108, 110 are similarly interconnected with the common offload tool 106. Although any number of test computers and users may be interconnected with the common offload tool 106, for clarity only two of each are illustrated herein. Additionally, a common storage repository 112 is interconnected with the common offload tool 106. The common storage repository 112 may comprise a large disk storage subsystem capable of holding, for example, many terabytes of data. Space 114, 116 is allocated in the common storage repository 112 for the files that each user 108, 110, respectively, has offloaded. The components in the environment 100 may be interconnected in any known manner, such as with direct wired connections or through a network.

Each test computer 102, 104 has associated with it a persistent table 118, 120, respectively, which has an entry for each file that has been offloaded from the computer to the common storage repository 112. These entries include, but are not limited to, the location in the common storage repository 112 of files that are currently offloaded. The tables 118, 120 may also include an entry for each file that is currently being transferred to the common storage repository 112. These entries include, but are not limited to, the destination in the common storage repository 112 of the in-transit files. An indicator may be used to indicate the status of each file: "offloaded" or "in-transit". Although in FIG. 1 the tables 118, 120 are stored in the associated computer 102, 104, they may instead be stored in the common offload tool 106 and the present invention does not depend upon their location.

The common offload tool 106 may comprise one or more servers operating under a protocol which enables the users 108, 110 to request that files on the test computers 102, 104 be offloaded into the common storage repository 112. In one embodiment, each user computer or terminal 108, 110 runs an instance of the protocol or common offload tool 106. It is also preferable for any file offloaded in the common storage repository 112 to be "locked" to prevent it from being modified.

Figure 2:
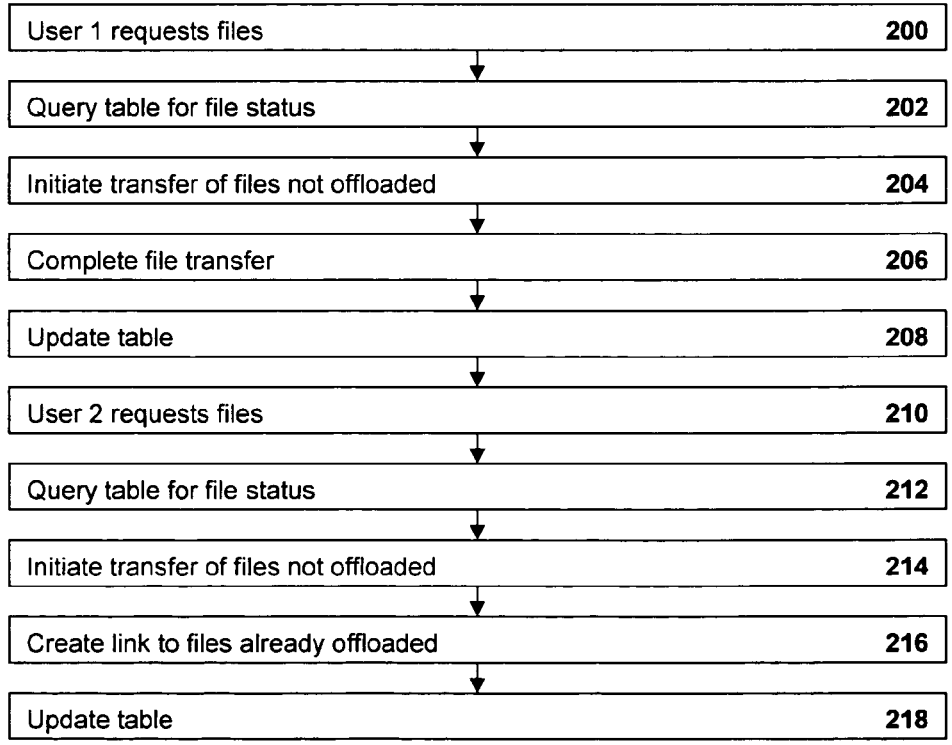
FIG. 2 is a flow chart of one example of the present invention.

FIG. 2 is a flow chart of one example of the present invention. A user 108 requests through the common offload tool 106 files A, B and C on one test computer 102 (step 200). The common offload tool 106 queries the table 118 associated with the test computer 102 to determine if any of the requested files has already been offloaded to the common storage repository 112 (step 202). If the common offload tool 106 determines that a previously offloaded file has the same name as a requested file, the common offload tool 106 also preferably determines if the contents of the already-offloaded file and the requested file have the same contents (step 204). If such an option is included in the process, a checksum, CRC or other value is calculated for each file that uniquely identifies the content of the file. A common utility program, such as the AIX routine "cksum", may be used. If two files have different checksum values, their contents are different even if they share the same file name. Consequently, they will be treated as different files by the common offload tool 106. In the example of FIG. 2, because none of the files A, B, C have already been offloaded, the common offload tool 106 initiates a transfer of the files (step 206) to space /LOC1 in the common storage repository 112.

For purposes of the example of FIG. 2, the transfer of all of the files A, B and C completes (step 208) and appropriate entries are made in the table 118 (step 210) indicating their new offloaded status before a second user 110 requires files from the same computer 102. The second user 110 requests through the common offload tool 106 files B, C and D on the test computer 102 (step 212). The common offload tool 106 again queries the table 118 to determine any of the requested files has already been offloaded to the common storage repository 112 (step 214) and verifies the uniqueness of the contents of the requested file (step 216). Files B and C are already in the common storage repository 112 and, assuming the contents of the requested files B and C are the same as the contents of the already-offloaded files B and C, instead of offloading these files again, the common offload tool 106 offloads file D (step 216) to /LOC2 in the common storage repository 112 and creates links in /LOC2 to files B and C in /LOC1 (step 218). Appropriate entries are then made in the table 118 indicating the new status of file D (step 220). Thus, because two of the requested files are already stored in the common storage repository 112, instead of using bandwidth and space to transfer and store all three requested files, only one is transferred.

Figure 3:
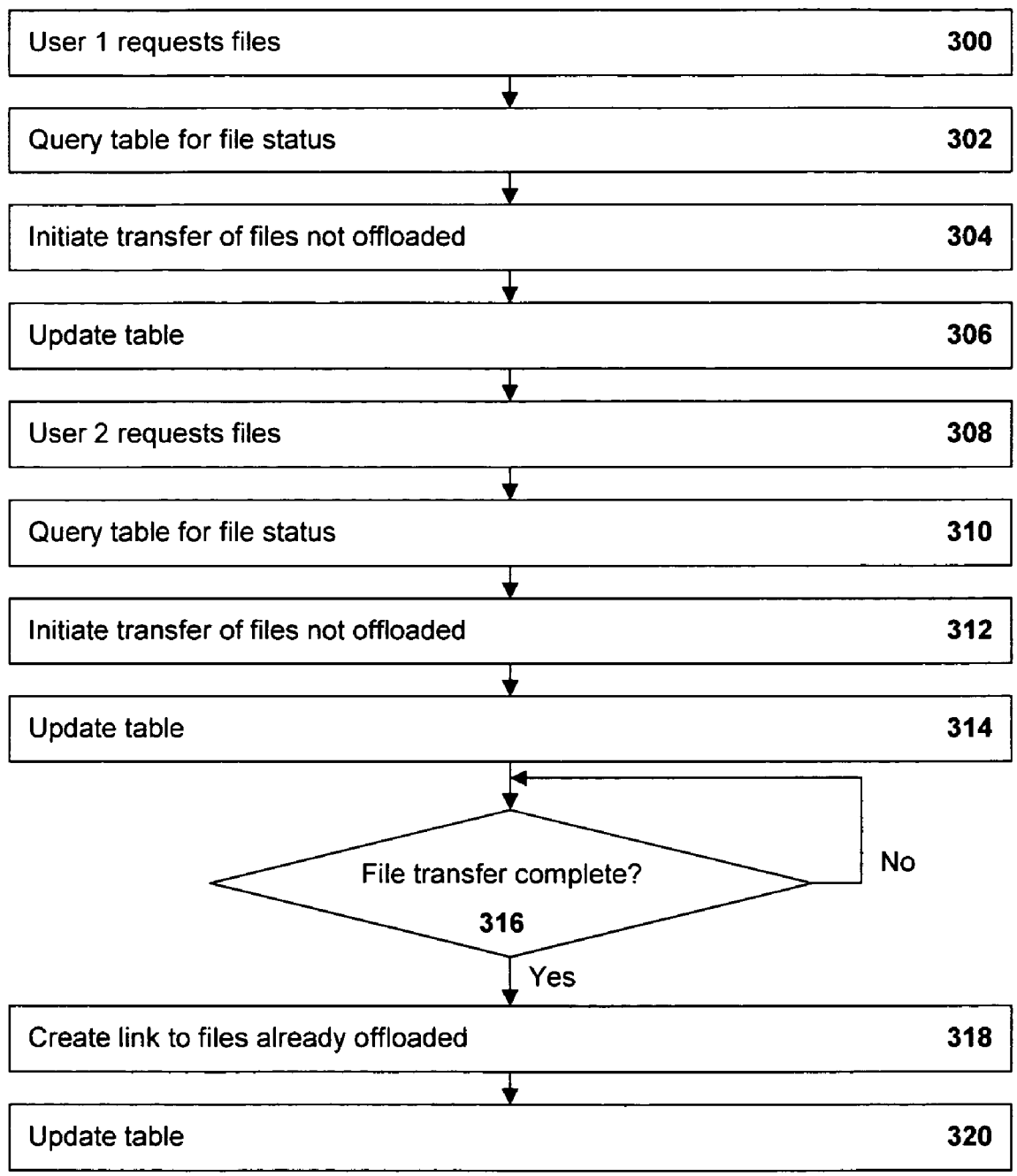
FIG. 3 is a flow chart of another example of the present invention.

FIG. 3 is a flow chart illustrating another aspect of the present invention. Again, the user 108 requests through the common offload tool 106 files A, B and C on one test computer 102 (step 300). The common offload tool 106 queries the table 118 associated with the test computer 102 to determine if any of the requested files has already been offloaded to the common storage repository 112 and if so, whether the contents are the same (step 302). Since none of the files A, B, C have already been offloaded, the common offload tool 106 initiates a transfer of the files (step 304) to space /LOC1 in the common storage repository 112 and adds entries into the table 118 indicating that the files are in transit (step 306).

For purposes of the example of FIG. 2, the second user 110 requests files B, C and D (step 308) before the transfer of the files A, B and C is complete. The common offload tool 106 again queries the table 118 to determine any of the requested files has already been offloaded or is in-transit to the common storage repository 112 and if so, whether the contents are the same (step 310). According to the table 118, files B and C are in-transit; the common offload tool 106 initiates the transfer of only file D to /LOC2 in the common storage repository 112 (step 312) and makes the appropriate entry in the table 118 (step 314). The common offload tool 106 waits until the transfer of the other two files B and C is complete (step 316) and then creates a link in /LOC2 to the files B and C in /LOC1 (step 318) and updates the table 118 with appropriate entries (step 320).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing files to be offloaded by multiple users into a common storage repository.

What is claimed is:

1. A method for managing files to be offloaded by multiple users into a common storage repository, comprising:
   receiving a request from a user to offload a file from a computer into a common storage repository;
   determining if the requested file is currently stored in a location in the common storage repository by:
   determining if the requested file has a same name as a file currently stored in the common storage repository; and
   if the requested file has the same name as a file currently stored in the common storage repository, determining if contents of the requested file are the same as contents of the file currently stored in the common storage repository by comparing a value that uniquely identifies the content of the requested file with a value that uniquely identifies the content of the file currently stored in the common storage repository;
   offloading the requested file to a first location in the common storage repository if the file is not currently stored in the common storage repository; and
   establishing for the user a link in a second location in the common storage repository to the location of the requested file in the common storage repository if the file is currently stored in the common storage repository.

2. The method of claim 1, further comprising:
   determining if the file is currently being transferred from the computer to the common storage repository; and
   if the file is currently being transferred, establishing for the user the link in the second location in the common storage repository to the location of the location of the requested file in the common storage repository when the transfer is complete.

3. The method of claim 1, further comprising establishing a table associated with the computer, the table having an entry for each file which is currently stored in the common storage repository indicating the location of the file, wherein determining if the file is currently stored in the common storage repository comprises accessing the table.

4. The method of claim 3, further comprising entering an entry into the table for each file which is currently being transferred from the computer to the common storage repository, the entry indicating that the file is currently being transferred.

5. The method of claim 4, further comprising:
   accessing the table to determine if the file is currently being transferred from the computer to the common storage repository; and
   if the file is currently being transferred, establishing for the user a link in the second location of the common storage repository to the location of the requested file in the common storage repository when the transfer is complete.

6. A common file offload management system, comprising:
a first interface to one or more computers having files to be accessed by one or more users;
a second interface permitting access to the files on the one or more computers by the one or more users; a third interface to a common storage repository for storing the accessed files;
means for receiving a request from a user to offload a file from a computer to the common storage repository;
means for determining if the file is currently stored in a location in the common storage repository by:
determining if the requested file has a same name as a file currently stored in the common storage repository; and
if the requested file has the same name as a file currently stored in the common storage repository, determining if contents of the requested file are the same as contents of the file currently stored in the common storage repository by comparing a value that uniquely identifies the content of the requested file with a value that uniquely identifies the content of the file currently stored in the common storage repository;
means for offloading the file to a first location in the common storage repository if the file is not currently stored in the common storage repository; and
means for establishing for the user a link in a second location in the common storage repository to the location of the requested file in the common storage repository if the file is currently stored in the common storage repository whereby the user.

7. The system of claim 6, further comprising:
means for determining if the file is currently being transferred from the computer to the common storage repository; and
means for establishing for the user the link in the second location in the common storage repository to the location of the requested file in the common storage repository when the transfer is complete if the file is currently being transferred.

8. The system of claim 6, further comprising means for accessing a table associated with the computer, the table having an entry for each file which is currently stored in the common storage repository indicating the location of the file, wherein the means for determining if the file is currently stored in the common storage repository comprises means for accessing the table.

9. The system of claim 8, further comprising means for reading an entry in the table for each file which is currently being transferred from the computer to the common storage repository, the entry indicating that the file is currently being transferred.

10. The system of claim 9, further comprising:
means for accessing the table to determine if the file is currently being transferred from the computer to the common storage repository; and
means for establishing for the user the link in the second location in the common storage repository to the location of the requested file in the common storage repository when the transfer is complete if the file is currently being transferred.

11. A computer program product of a computer readable medium usable with a programmable computer, the computer program product having computer-readable code embodied therein for managing files to be offloaded by multiple users into a common storage repository, the computer-readable code comprising instructions for:
receiving a request from a user to offload a file from a computer into a common storage repository;
determining if the file is currently stored in a location in the common storage repository (the "first location") by:
determining
if the requested file has a same name as a file currently stored in the common storage repository; and
if the requested file has the same name as a file currently stored in the common storage repository, determining if contents of the requested file are the same as contents of the file currently stored in the common storage repository by comparing a value that uniquely identifies the content of the requested file with a value that uniquely identifies the content of the file currently stored in the common storage repository;
offloading the file to the first location in the common storage repository if the file is not currently stored in the common storage repository; and
establishing for the user a link in a second location in the common storage repository to the first location in the common storage repository if the file is currently stored in the common storage repository.

12. The computer program product of claim 11, the computer-readable code further comprising instructions for:
determining if the file is currently being transferred from the computer to the common storage repository; and
if the file is currently being transferred, establishing for the user the link in the second location in the common storage repository to the location of the requested file in the common storage repository when the transfer is complete.

13. The computer program product of claim 11, the computer-readable code further comprising instructions for establishing a table associated with the computer, the table having an entry for each file which is currently stored in the common storage repository indicating the location of the file, wherein determining if the file is currently stored in the common storage repository comprises accessing the table.

14. The computer program product of claim 13, the computer-readable code further comprising instructions for entering an entry into the table for each file which is currently being transferred from the computer to the common storage repository, the entry indicating that the file is currently being transferred.

15. The computer program product of claim 13, the computer-readable code further comprising instructions for:
accessing the table to determine if the file is currently being transferred from the computer to the common storage repository; and
if the file is currently being transferred, establishing for the user a link in the second location of the common storage repository to the location of the requested file in the common storage repository when the transfer is complete.

* * * * *

UNITED STATES PATENT AND TRADEMARK OFFICE
CERTIFICATE OF CORRECTION

PATENT NO. : 7,596,588 B2  Page 1 of 1
APPLICATION NO. : 11/327086
DATED : September 29, 2009
INVENTOR(S) : Pruitt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this

Twenty-eighth Day of September, 2010

David J. Kappos
*Director of the United States Patent and Trademark Office*